(12) United States Patent
Vanel et al.

(10) Patent No.: US 10,829,054 B2
(45) Date of Patent: Nov. 10, 2020

(54) STORING DEVICE COMPRISING A FIRST AND A SECOND BODY MOVABLE ONE RELATIVE TO THE OTHER

(71) Applicant: FAURECIA INTERIEUR INDUSTRIE, Nanterre (FR)

(72) Inventors: Eric Vanel, Novillers (FR); Frederic Biguet, Beaumont-sur-Oise (FR); Pierre Emmanuel Coste, Parmain (FR); Thomas Angebault, Chatou (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 157 days.

(21) Appl. No.: 16/159,792

(22) Filed: Oct. 15, 2018

(65) Prior Publication Data

US 2019/0111850 A1     Apr. 18, 2019

(30) Foreign Application Priority Data

Oct. 18, 2017 (FR) ...................................... 17 59770

(51) Int. Cl.
*B60R 7/04* (2006.01)
*B60N 2/75* (2018.01)
*B60R 11/00* (2006.01)

(52) U.S. Cl.
CPC ................. *B60R 7/04* (2013.01); *B60N 2/793* (2018.02); *B60R 2011/0082* (2013.01); *B60R 2011/0084* (2013.01)

(58) Field of Classification Search
CPC ................. B60R 7/04; B60R 2011/008; B60R 2011/0084; B60R 7/06; B60N 2/75; B60N 2/79; B60N 2/793; B60N 2/46

USPC ......................................................... 296/37.1
See application file for complete search history.

(56) References Cited

U.S. PATENT DOCUMENTS

| 5,085,481 A * | 2/1992 | Fluharty | B60R 7/04 296/37.14 |
| 5,246,151 A * | 9/1993 | Jabara | B60R 7/04 220/23.83 |
| 7,370,898 B2 * | 5/2008 | Sturt | B60R 7/04 296/24.34 |
| 7,481,475 B1 * | 1/2009 | Lim | B60R 7/04 296/24.34 |

(Continued)

FOREIGN PATENT DOCUMENTS

EP     1391349 A1     2/2004

OTHER PUBLICATIONS

French Search Report on French application No. FR 1759770, dated May 18, 2018, 2 pages.

*Primary Examiner* — Hilary L Gutman
(74) *Attorney, Agent, or Firm* — Reising Ethington P.C.

(57) ABSTRACT

A storing device having at least one first body defining at least a first storage volume accessible through a first opening, and at least one second body defining at least one second storage volume accessible through a second opening. The first body and the second body are movable relative to one another along a first direction between a close position and a separated position. The first opening is arranged so that the first storage volume is accessible along the first direction, with the first storage volume being closed along the first direction by the second body in the close position and being accessible along the first direction in the separated position.

10 Claims, 2 Drawing Sheets

(56) References Cited

U.S. PATENT DOCUMENTS

| | | | |
|---|---|---|---|
| 7,533,918 B2 * | 5/2009 | Spykerman | B60N 2/793 296/24.34 |
| 10,011,240 B1 * | 7/2018 | Ranganathan | B60R 7/04 |
| 10,668,861 B2 * | 6/2020 | Vican | B60R 7/04 |
| 2003/0155786 A1 | 8/2003 | Kim et al. | |
| 2004/0026947 A1 | 2/2004 | Kitano et al. | |
| 2010/0078954 A1 * | 4/2010 | Liu | B60N 2/793 296/24.34 |
| 2010/0090491 A1 * | 4/2010 | Hipshier | B60R 7/04 296/24.34 |
| 2011/0127791 A1 * | 6/2011 | Penner | B60R 7/04 296/24.34 |
| 2018/0178733 A1 * | 6/2018 | Faruque | B60R 7/04 |
| 2019/0283680 A1 * | 9/2019 | Vican | B60R 7/04 |

* cited by examiner

STORING DEVICE COMPRISING A FIRST AND A SECOND BODY MOVABLE ONE RELATIVE TO THE OTHER

FIELD OF THE INVENTION

The present invention relates to a vehicle storing device, of the type including at least one first body defining at least a first storage volume accessible through a first opening, and at least one second body defining at least one second storage volume accessible through a second opening, the first body and the second body being movable relative to one another along a first direction between a close position, in which the first body and the second body are applied against one another, and at least one separated position, in which the first body and the second body are separated from one another along the first direction.

The invention also relates to a vehicle including such a storing device.

BACKGROUND

It is known to provide one or several storage volumes in the passenger compartment of a vehicle, for example a motor vehicle, provided to store more or less bulky objects therein while leaving these objects accessible to the passengers of the vehicle. For example, a glovebox and storage volumes in the door panels may be provided. A center console of the vehicle, arranged between the front seats, is also generally provided with a storage volume.

The storage volumes are generally closed when a user does not wish to access them. To that end, a pivoting lid is for example provided making it possible to free the storage volume when one wishes to access it and to close it when a user does not wish to access it. Advantageously, in the case of a storage volume provided in an armrest or in a center console, the lid may also form a bearing surface for the user's arm when the volume is closed.

However, the bearing surface is unusable when the lid is in the open position. Furthermore, the actuation of the lid may be uncomfortable for the user and not make it possible to open the lid while accessing the storage volume in a single gesture by the hand. Additionally, car manufacturers are constantly seeking to offer more storage spaces for vehicle passengers and to make these storage spaces ever more configurable.

SUMMARY

One aim of the invention is to offset these drawbacks by proposing a storing device offering several easily accessible and configurable storage volumes.

To that end, the invention relates to a storage device of the aforementioned type, wherein the first opening is arranged so that the first storage volume is accessible along the first direction, said first storage volume being closed along the first direction by the second body in the close position and being accessible along the first direction in the separated position.

The storing device according to at least some embodiments of the invention includes several storage volumes accessible along different directions and in different configurations of the storing device. Thus, the storing device is highly configurable and can be adapted to all postures of a user.

Various embodiments of the invention may include the following other optional features, considered alone or according to any technically possible combination:

the second opening is arranged so that the second storage volume is accessible in a second direction, different from the first direction, the first body and/or the second body further define a third storage volume, the third storage volume is accessible along the second direction, the first body and/or the second body define an additional storage volume between them in the separated position, the first body and/or the second body is translatable along the first direction between the close and separated positions, the second body includes a closing device for closing the second opening, said closing device at least partially closing said second opening in at least one closing position of said closing device, the closing device forms at least one bearing surface for at least one limb of a passenger of the vehicle, the storage device forms a vehicle center console.

According to another aspect, the invention further relates to a vehicle including at least two seats and at least one storing device as described above, the storing device extending between the two seats such that the storing device is accessible to one and/or the other of the passengers of said seats.

BRIEF DESCRIPTION OF THE DRAWINGS

Other aspects and advantages of the invention will appear upon reading the following description, provided as an example, and done in reference to the appended drawings, in which.

DETAILED DESCRIPTION

Figure 1:
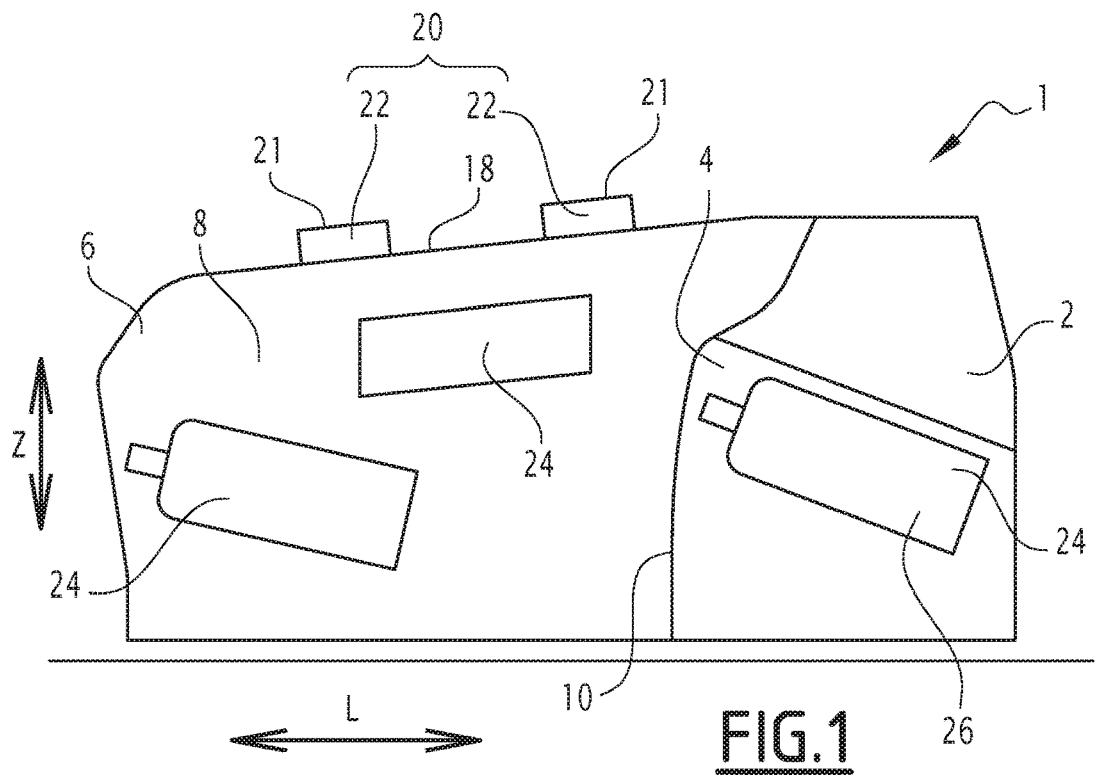
FIG. 1 is a sectional schematic illustration of a storing device according to an embodiment of the invention, showing first and second bodies of the storing device being in a close position.

In reference to FIGS. 1 to 4, a storing device 1 is described including a first body 2, defining at least one first storage volume 4, and at least one second body 6, defining at least one second storage volume 8. The first and second storage volumes 4, 8 are capable of receiving objects of all kinds.

According to the embodiment shown in the figures, the storing device 1 forms a vehicle center console arranged between two seats, for example the front seats of the vehicle. It is, however, understood that embodiments of the invention include any type of storing device arranged in the passenger compartment of a vehicle, for example a storing device provided in the armrest of a seat or the like. The vehicle may further include rear seats extending parallel to the front seats behind them in the vehicle relative to said front seats.

The first storage volume 4 is accessible through a first opening 10 formed in the first body 2. According to the embodiment shown in the figures, the first body 2 assumes the form of a hollow polyhedron and the first opening 10 extends over one or two faces of the polyhedron. A user passing his hand through the first opening 10 can access the first volume 4 to place an object therein or take an object therefrom. The first opening 10 is arranged so that a user wishing to access the first storage volume 4 must move his arm along a motion including a component extending along a first direction L. In other words, the user's arm moves at least partially along the first direction L to penetrate the first storage volume 4 by passing through the first opening 10. In other words, the first opening 10 is arranged so that the first storage volume 4 is accessible along the first direction L. Thus, as an example, the first opening 10 extends at least partially in a plane substantially perpendicular to the first direction L. It is understood that any shape of first body 2 and first opening 10 can be considered; thus, for example, the first opening 10 may extend over all or part of the first storage volume 4. In the case of a center console, the first direction is for example the longitudinal direction of the vehicle, corresponding to the front-back direction of the vehicle.

It should be noted that aside from the first direction, the first storage volume 4 may be accessible along another direction, as will be described later.

Figure 2:
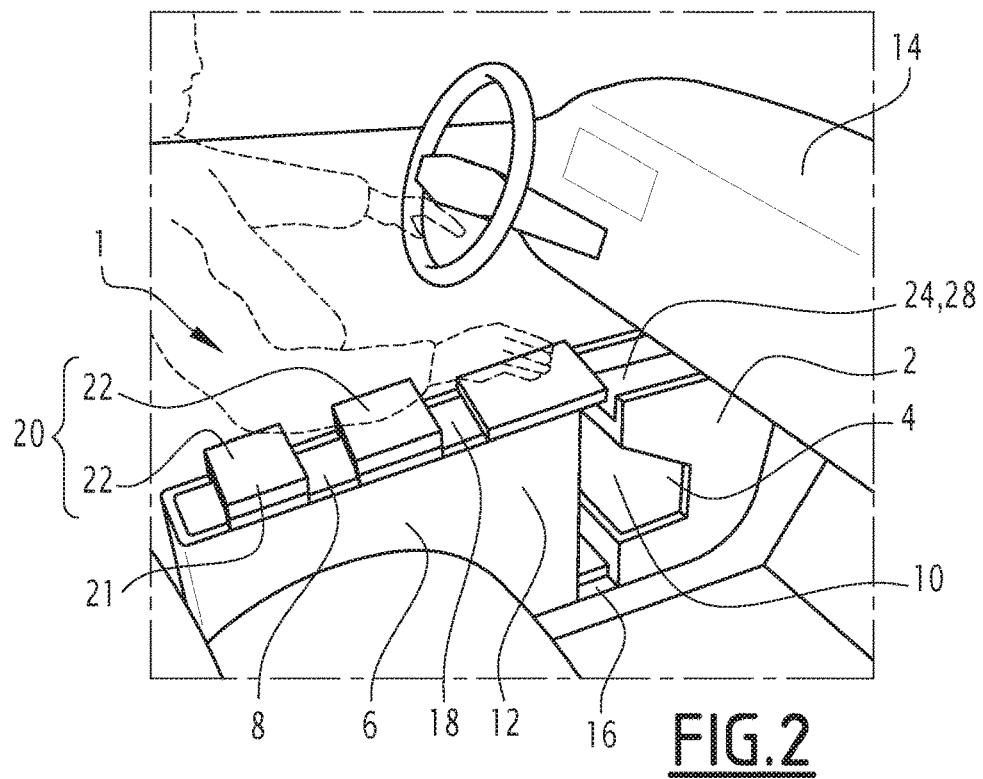
FIGS. 2 to 4 are schematic perspective illustrations of the storing device of FIG. 1, in different separated positions of the first and second bodies of the storing device.
Figure 3:
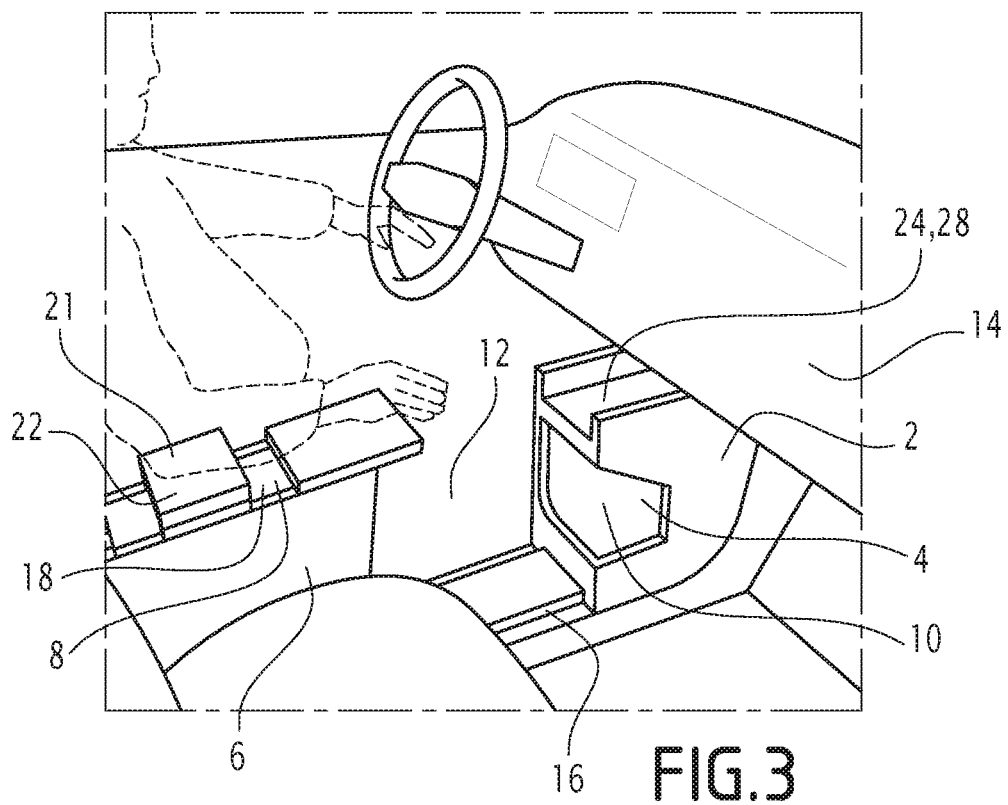
Figure 4:
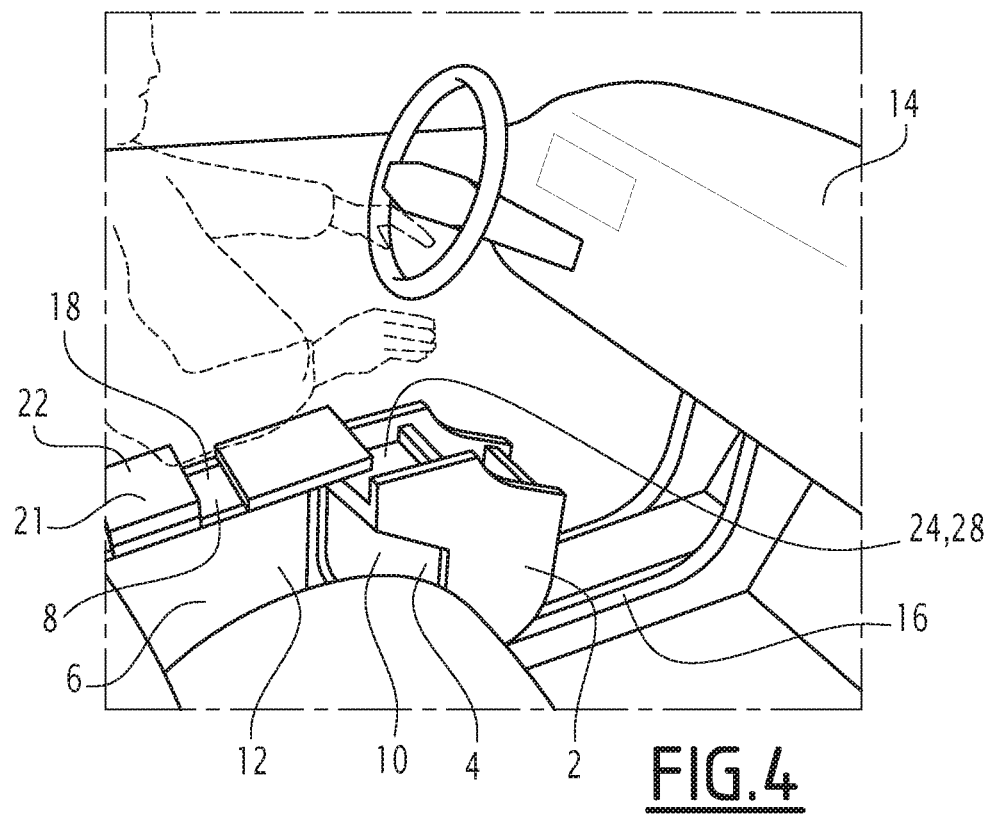

The first body 2 and the second body 6 are movable relative to one another in the first direction L between a close position (FIG. 1) and at least one separate position (FIGS. 2 to 4).

In the close position, the first body 2 and the second body 6 are applied against one another and the second body 6 is arranged to close the first storage volume 4 such that the latter is inaccessible along the first direction L from outside the storage device 1. To that end, the second body 6 has a shape arranged to close the first opening 10 along the first direction L when the first body 2 and the second body 6 are in the close position. For example, the second body 6 includes at least one wall substantially complementary to the first opening 10 and arranged to extend over the first opening 10 in the close position. Alternatively, the second body 6 has a space for receiving a part of the first body 2 including the first opening 10, this part of the first body 2 being housed in and closing the receiving space in the close position such that the first opening 10 extends in the receiving space in the close position. Thus, in the close position, the first storage volume 4 is closed and inaccessible, such that the objects it contains cannot be removed therefrom.

In the separated position, the first body 2 and the second body 6 are separated from one another along the first direction L such that a space 12 extends between the first body 2 and the second body 6. In this position, the first opening 10 of the second body 6 is free and the first storage volume 4 becomes accessible at least along the first direction L. In the case of a center console, accessible means that at least one of the passengers seated on one of the front seats can plunge his hand into the first storage volume 4 by passing through the first opening 10. The distance separating the first body 2 from the second body 6 along the first direction L may be adjusted, such that the storage device 1 can adopt several separated positions, in which the first body 6 is more or less far away from the second body and in which the space 12 is larger or smaller along the first direction. As an example, the first body 2 may be moved between a first extreme separated position, shown in FIG. 3 and in which the first body 2 is furthest from the second body 6, and a second extreme separated position, shown in FIG. 4, in which the first body 2 is not as far from the second body 6, by going through at least one intermediate separated position, shown in FIG. 2 and in which the second body 6 is found between the first and second extreme separated positions. In the first extreme separated position, in the case of a center console, the first body 2 is for example moved until it extends at least partially below the dashboard 14 of the vehicle. In this position, the space 12 may for example form an additional storage volume suitable for receiving bulkier objects, such as a bag or the like. In the second extreme separated position, the first body 2 is for example brought closer to the second body 6 so as to leave a space 12 such that the first storage volume 4 is close to the front seats and easily accessible without a passenger having to lean to access it. In the intermediate separated position, the space 12 is such that it can receive an object that is for example held between the first body 2 and the second body 6.

According to one embodiment, the first body 2 further includes a device for closing the first opening 10 making it possible to close the first storage volume 4 completely or partially when the first and second bodies 2, 6 are in a separated position. Such a closing device is for example formed by one or two curtains mounted sliding on the first opening 10 between a retracted position, in which they allow access to the first opening 10, and a closed position, in which they extend over the first opening 10 and close the first storage volume 4. If two curtains are provided, these for example come together over the first opening 10 in the closed position and separate from one another when they are moved toward the open position. Such curtains can adopt a multitude of positions between the retracted and closed positions in which they close the first opening 10 more or less. Such a closing device may be used to close the first storage volume 4 completely when the first and second bodies 2, 6 are in a separated position and thus to prevent objects from falling outside the first storage volume 4.

The movement between the close and separated positions is for example done by translating the first body 2 relative to the second body 6 along the first direction L. To that end, the first body 2 is for example mounted on rails 16 extending along the first direction L on the floor of the vehicle or on a base on which the first and second bodies 2 and 6 are mounted.

It is understood that the second body 6 may also be movable along the first direction L. For example, the second body 6 may be mounted on the same rails as the first body 2. In this case, the second body 6 may for example be moved away from the first body 2 so as to bring it closer to the rear seats of the vehicle. By making the first body 2 and the second body 6 movable, one increases the number of separated positions that the storing device 1 may adopt. One then also makes it possible to position the first and second bodies 2 and 6 freely in the close position along the first direction. Thus, the first and second bodies 2 and 6 may be in the close position which being more or less far away from the front and rear seats of the vehicle. In other words, in this case the storing device 1 may also be positioned in several close positions.

According to one embodiment, the storing device 1 includes one or several devices for locking the first and second bodies 2 and 6 to one another and/or relative to the floor of the vehicle. Such a locking device is for example arranged to fasten the first and second bodies 2 and 6 to one another when they are in the close position so as to secure their joint movement relative to the floor. In other words, in the close and locked position, the movement of one body drives the movement of the other body, the latter parts staying in the close position during this movement. The locking device or another locking device may also be used to lock the position of one or more of the first and second bodies 2 and 6 on the floor such that the locked first and second bodies 2 and 6 remain immobile on the floor even when a user exerts a bearing force that would tend to move said first and second bodies 2 and 6.

The second storage volume 8 is accessible through a second opening 18 formed in the second body 6. According to the embodiment shown in the figures, the second body 6 has, aside from the part cooperating with the first body 2 previously described, a hollow rhomb shape whereof one face is removed to form the second opening 18. It is understood that any shape of second body 6 and second opening 18 can be considered. Thus, as an example, the second opening 18 can extend over all or part of the second storage volume 8.

The second opening 18 is arranged so that a user wishing to access the second storage volume 8 must move his arm along a motion including a component extending along a second direction Z, different from the first direction L. In other words, the user's arm moves at least partially along the second direction Z to penetrate the second storage volume 8 by passing through the second opening 18. In other words, the second opening 18 is arranged so that the second storage volume 8 is accessible along the second direction Z. Thus, as an example, the second opening 18 extends at least partially in a plane substantially perpendicular to the second direction Z. It is understood that any shape of second body 6 and second opening 18 can be considered. Thus, as an example, the second opening 18 can extend over all or part of the second storage volume 8. In the case of a center console, the second direction is for example the elevation direction of the vehicle, corresponding to the height of the vehicle.

Thus, the access to the second storage volume 8 is done independently of the position of the first body 2 and the second body 6 relative to one another, since the first body 2 does not close the storage volume 8 in the close position.

According to one embodiment, the second body 6 includes a closing device 20 of the second opening 18 arranged to close the second opening 18 at least partially, and therefore the second storage volume 8 in a closed position. According to one embodiment, the closing device 20 completely closes the second storage volume 8 in the closed position and frees access to the second storage volume 8 in an open position. Such a closing device 20 is for example formed by a pivoting flap, a curtain or two curtains, as is known in itself. Advantageously, the closing device 20 forms a bearing surface 21 for at least one limb of a passenger of the vehicle. To that end, the bearing surface 21 is for example formed on the outer face of the closing device, facing outward and away from the face extending opposite the second storage volume 8. The bearing surface may be formed by a trim element extending over at least part of the outer face.

According to another embodiment, shown in the figures, the closing device 20 includes at least two cover elements 22 that are movable relative to one another and relative to the second opening 18. The two cover elements 22 are for example translatable on the second body 6 along the first direction L and are such that the sum of the dimensions of the cover elements 21 along the first direction L is smaller than the dimension of the second opening 18 along the first direction L. Such an arrangement makes it possible to leave the second storage volume 8 accessible in all positions of the cover elements 22, since part of the second opening 18 remains uncovered by a cover element 22, irrespective of the position of the two cover elements 22. The cover elements 22 can be moved into close positions, in which the cover elements 22 are applied against one another, and separated positions, in which the cover elements 22 are separated from one another. In the close positions, the cover elements 22 form an extended bearing surface 21 and allow access to the second storage volume 8 on one side and/or the other of the cover elements 22. In the separated positions, the cover elements 22 allow access to the second storage volume 8 between the cover elements 22, as shown in the figures. Such cover elements 22 are particularly ergonomic, a user being able to place the cover elements 22 where he wishes in order to improve his comfort and/or to access the second storage volume 8 in various ways. In particular, a user may, in a single motion and with a single hand, move a cover element 22 and plug his hand into the access to the storage volume thus freed. Furthermore, the cover elements 22 may be used as a bearing surface in all of the positions thereof, which makes the storing device 1 suitable for forming an armrest usable in several configurations, in a door module or in a center console, for example. It is understood that three or more cover elements could be provided to further increase the number of possible configurations in which the storing device may be placed.

According to different embodiments, the first body 2 and/or the second body 6 include a third storage volume 24. Such a third storage volume 24 may be separated from the first and/or second storage volumes 4 and 8 by a wall extending in the first body 2 and/or the second body 6. Alternatively, the third storage volume 24 may be formed by a drawer extending in the first and/or the second body 2 and 6 and movable, for example along the first direction, relative to the body in which it is arranged so as to modify the position and/or the accessibility thereof. Thus, for example, the first body 2 includes a drawer 26 movable between a retracted position (FIG. 1), in which the drawer 26 extends completely in the first body 2, and a deployed position, in which the drawer 26 leaves the first body 2, for example by passing through the first opening 10. Thus, the drawer 26 can be placed in the deployed position when the first and second bodies 2 and 6 are in the separated position. According to another example, alternatively or additionally, the first body 2 includes a storage space 28 accessible along the second direction Z and extending above the first storage volume 4 along this second direction Z. This storage space 28 may be closed, at least partially, by the second body 6 when the first and second bodies 2 and 6 are in the close position by adapting the shape of the second body 6 accordingly. Alternatively, the storage space 28 may be arranged to be accessible in all positions of the storage device 1.

The storage device 1 described above is highly configurable and offers a large number of storage volumes. Furthermore, it is suitable for forming a bearing surface for a user, this surface being adaptable to the position of the user in the vehicle.

The invention claimed is:

1. A vehicle storing device comprising at least one first body defining at least a first storage volume accessible through a first opening, and at least one second body defining at least one second storage volume accessible through a second opening, the first body and the second body being movable relative to one another along a first direction between a close position, in which the first body and the second body are applied against one another, and at least one separated position, in which the first body and the second body are separated from one another along the first direction, wherein the first opening is arranged so that the first storage volume is accessible along the first direction, said first storage volume being closed along the first direction by the second body in the close position and being accessible along the first direction in the separated position, and wherein the first body is movable relative to the second body by moving one of said first and second bodies on rails extending in the first direction.

2. The storing device according to claim 1, wherein the second opening is arranged so that the second storage volume is accessible in a second direction, different from the first direction.

3. The storing device according to claim 1, wherein the first body and/or the second body further define a third storage volume.

4. The storing device according to claim 3, wherein the third storage volume is accessible along the second direction.

5. The storing device according to claim 1, wherein the first body and the second body define an additional storage volume therebetween in the separated position.

6. The storing device according to claim 1, wherein the first body and/or the second body is translatable along the first direction between the close and separated positions.

7. The storing device according to claim 1, wherein the second body comprises a closing device for closing the second opening, said closing device at least partially closing said second opening in at least one closed position of said closing device.

8. The storing device according to claim 7, wherein the closing device forms at least one bearing surface for at least one limb of a passenger of the vehicle.

9. A vehicle center console comprising the storing device according to claim 1.

10. A vehicle including at least two seats and at least one storing device according to claim 1, the storing device extending between the two seats such that the storing device is accessible to one and/or the other of the passengers of said seats.

* * * * *